May 19, 1964  R. J. CLEMENTS ET AL  3,134,069
WELL LOGGING APPARATUS HAVING DETECTOR MEANS IN A ROTATABLE
CASING MOUNTED WITHIN A DRILL STRING FOR
SIMULTANEOUS DRILLING AND LOGGING
Filed Jan. 30, 1959                                    2 Sheets-Sheet 1

United States Patent Office 3,134,069
Patented May 19, 1964

3,134,069
WELL LOGGING APPARATUS HAVING DETECTOR MEANS IN A ROTATABLE CASING MOUNTED WITHIN A DRILL STRING FOR SIMULTANEOUS DRILLING AND LOGGING
Roy J. Clements and Burton D. Lee, Houston, and Roland B. Stelzer and William R. McEvers, Jr., Bellaire, Tex., assignors to Texaco Inc., a corporation of Delaware
Filed Jan. 30, 1959, Ser. No. 790,262
11 Claims. (Cl. 324—10)

This invention relates to well logging apparatus and more particularly to apparatus for simultaneously drilling and logging a borehole.

In the conventional method of logging a borehole, the log is obtained while the drilling operation is periodically interrupted, during which period the drill pipe is removed and the logging instrument suspended by a steel shrouded multiconductor cable is lowered into the borehole. After the instrument penetrates different geophysical strata, information in the form of electrical signals is transmitted from the borehole through the conductor cable to the surface where it is recorded on a chart.

There are several disadvantages in using the conventional logging method. An important disadvantage is that the drilling rig must be idle while the logging crew takes over the borehole. Furthermore, during the drilling operation, the drilling fluid in the borehole invades the formation around the borehole changing the electrical characteristics of the formation. Invasion of the fluid is progressive with time and may sufficiently contaminate the formation to confuse the interpretation of logs which are obtained at a considerable time after the mud begins to invade the formations. Depth control to a certain formation is difficult in that the desired strata may have been drilled through before a log is run.

It has been found that many of these disadvantages may be eliminated or mitigated by simultaneously logging and drilling. Early efforts to achieve the objectives of logging while drilling have been found to be commercially impractical.

An improved logging while drilling method which has produced logs comparable to those obtained by conventional logging methods has been disclosed in a U.S. patent application filed by R. J. Clements, B. D. Lee and R. B. Stelzer on August 13, 1957, having Serial No. 677,969. The improved method comprises the steps of drilling a borehole, simultaneously and continuously detecting a physical variable in the hole, simultaneously and continuously recording in the hole the physical variable, and simultaneously and continuously recording the depth in the hole at which the physical variable is being detected. The present invention provides improved apparatus which may be used in carrying out the above described method of logging while drilling.

The improved apparatus comprises a tubular member or housing adapted to be inserted in a drill stem or string, a sealed container or pressure tight capsule disposed within and secured to the housing and adapted and arranged to permit the passage of fluid through the housing, a rotatable inner case having a supporting shaft connected at each end thereof disposed within the capsule, alternating current generating means including a commutator having a coin silver brush, means for passing electric energy between the capsule and inner case through one of the supporting shafts and means disposed within the inner case for continuously receiving a signal.

In order that the invention may be more clearly understood and readily carried into effect, it will now be described more fully with reference to the accompanying drawing in which:

FIG. 3 illustrates a drill stem having a modified electrode arrangement mounted thereon.

Figure 1:
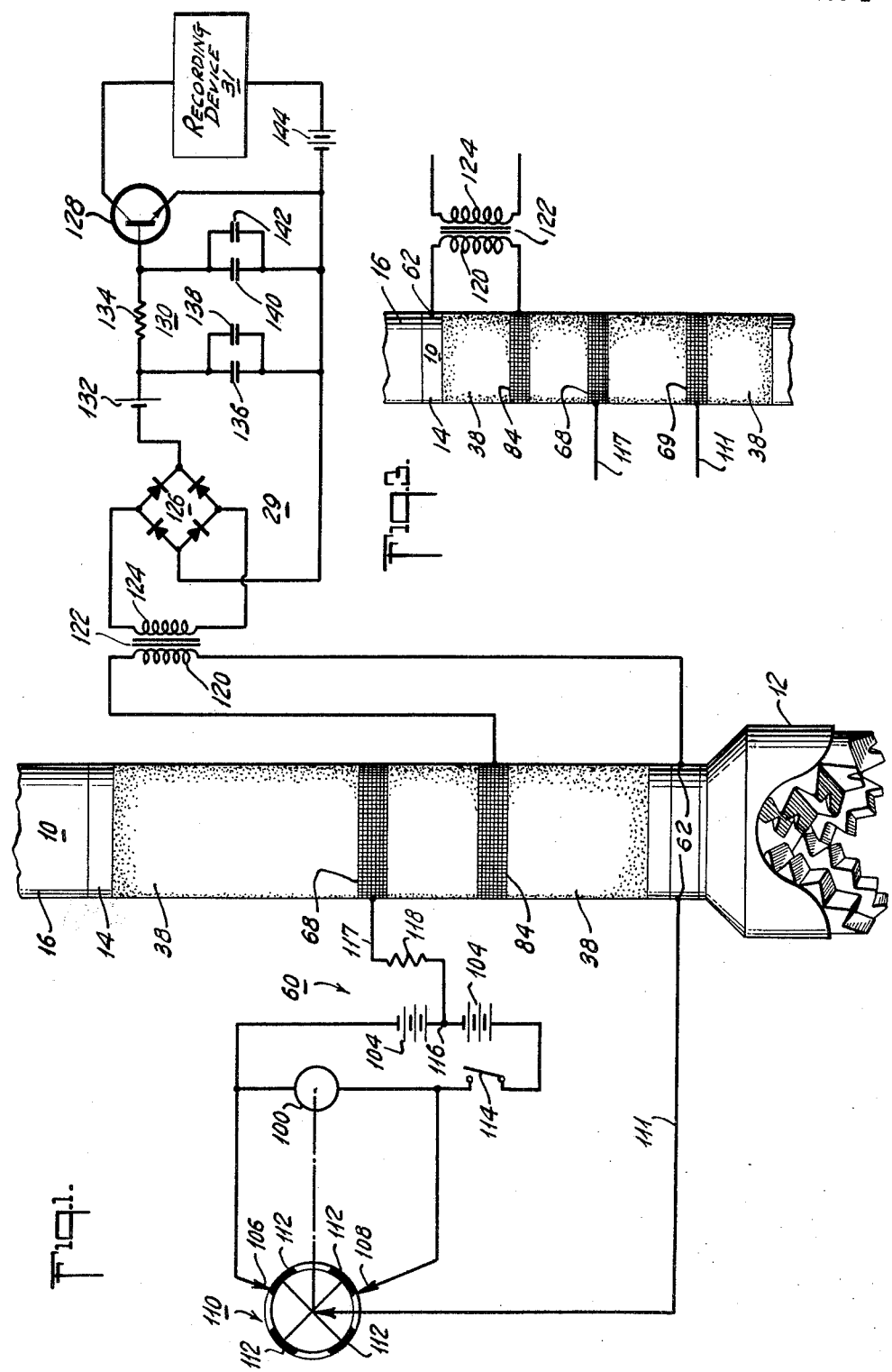
FIG. 1 is a diagram of an electrical logging circuit of the invention connected to electrodes mounted on a drill stem.

Referring to the drawings in more detail wherein like elements have the same reference numerals, there is shown in FIG. 1 the lower portion of a drill stem or string 10 including a drill bit 12 connected to one end of a tubular housing or pipe 14 and a conventional drill collar 16 connected to the other end of the housing 14.

Figure 2:
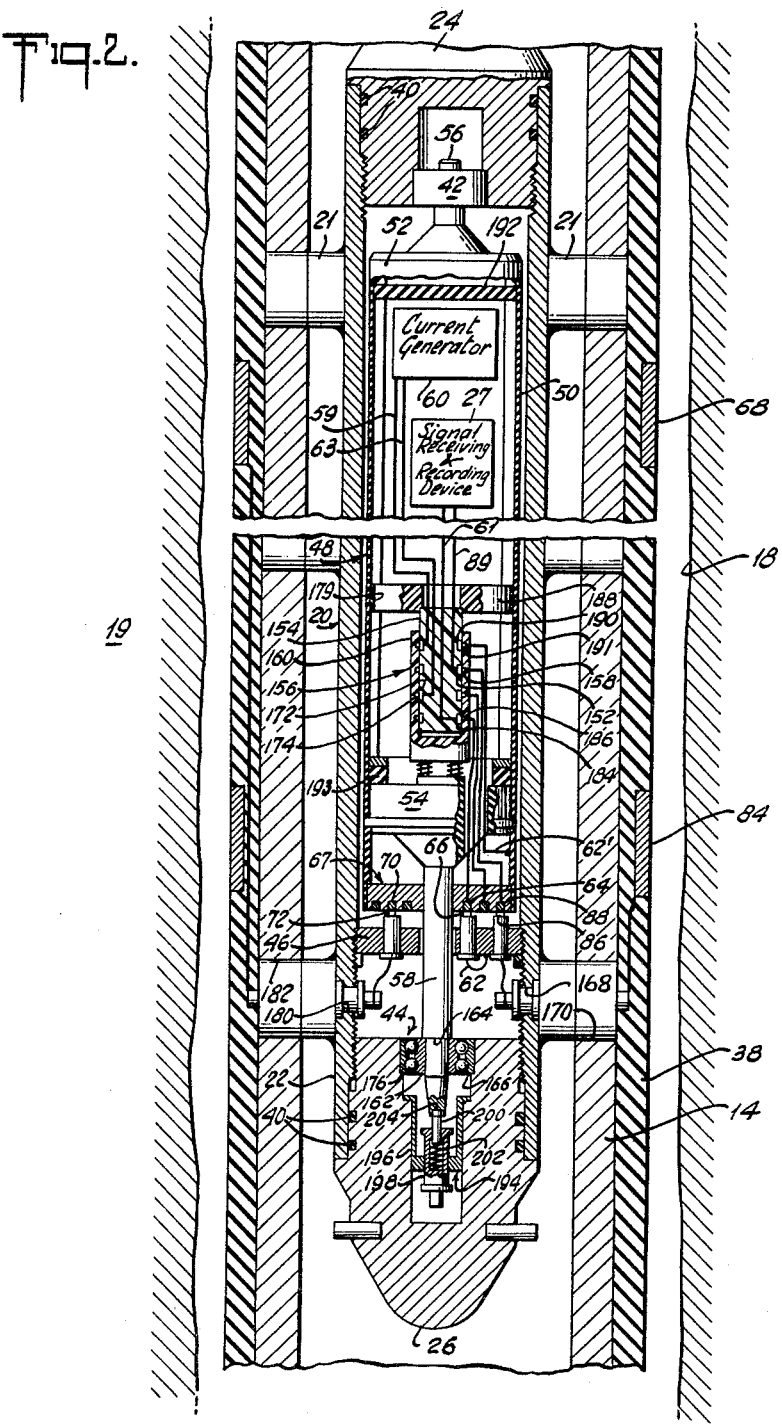
FIG. 2 is a longitudinal sectional view of a portion of the drill stem of the apparatus of the invention illustrating particularly the electrical connections between the circuitry in the inner case and the external electrodes mounted on the drill pipe.

Within the housing 14 is a sealed container or capsule 20 adapted to withstand pressures of at least 16,000 to 20,000 pounds per square inch, disposed coaxially therewith and rigidly secured thereto by bosses or studs 21 as shown in FIG. 2 of the drawing. The capsule 20 includes a hollow cylinder 22 and top and bottom caps 24 and 26. The top and bottom caps 24 and 26 of the capsule 20 threadedly engage the cylinder 22. O-rings 40 are located between the caps 24 and 26 and the cylinder 22 to provide effective pressure seals for the capsule 20. Mounted in the top and bottom caps 24 and 26 along the axis of the cylinder 22 are upper and lower thrust bearings 42 and 44, respectively. Disposed within the pressure tight capsule 20 is an inner case 48 including a cylinder 50 and upper and lower end plates 52 and 54 having upper and lower support shafts 56 and 58, respectively. The shafts 56 and 58 are disposed along the axis of the inner case 48 and engage the thrust bearings 42 and 44, respectively, in the caps 24 and 26 to substantially isolate the inner case 48 from torsional forces, applied to the drill stem 10 by a prime mover during the drilling process due to the rotatability of the inner case 48 with respect to the capsule 20 and the drill stem 10. A stationary disk 46, having a centrally disposed opening therein and preferably threadedly engaged to the cylinder 22 of the capsule 20, is disposed within the capsule 20 at one end of the inner case 48 so as to permit the lower shaft 58 to pass through its opening.

The inner case 48 contains a constant current generator 60 and a signal receiving and recording device 27 mounted on a frame 188 which is adapted to be inserted into and to snugly fit within the inner case 48. The apparatus of this invention includes improved means for providing an electrical connection between the current generator 60 and the signal receiving and recording device 27 disposed within the inner case 48 and the electrodes mounted on the housing.

More particularly, the inner case 48 contains a generator 60 for supplying alternating current to the formation, for example, subsurface formation 19, traversed by the borehole 18. One terminal of the generator 60 is connected to a common electrical point 62, which may be any convenient point effectively on the drill stem 10, and the other terminal of the generator 60 is connected to an external current electrode 68 exposed substantially midway between the ends of an insulating layer 38 surrounding the housing 14. The external current electrode 68 is embedded in the insulating layer 38 so as to be insulated from the tubular housing 14. The signal receiving and recording means 27 includes a signal receiving circuit 29 which amplifies and filters the voltage detected between a potential electrode 84 spaced a short distance from the current electrode and insulated from the housing 14, and the common point 62 and a recording device 31 which records the detected voltage.

As shown in FIG. 1 the constant alternating current generator 60 includes a battery 104, preferably composed of a plurality of mercury cells, connected between first and second brushes 106 and 108 of a commutator 110 having four interconnected copper segments 112 connected via lead 111 to the common point 62, a first switch 114 interposed between a terminal of battery 104 and the second commutator brush 108, and a motor 100 connected across the battery 104 via the switch 114 and coupled to drive commutator 110. The mid-point of battery 104 is connected to the current electrode 68 via lead 117 and a resistor 118 having a high resistance value compared with the resistance of the earth formations to produce a substantially constant current which is supplied to the earth formations. In accordance with one feature of this invention, in order to eleminate or at least substantially reduce arcing which heretofor has developed in the apparatus after long periods of operation, the commutator brushes consist essentially of an alloy having 85 to 95 percent silver and the remainder copper, or, more particularly, coin silver.

In the signal receiving circuit 29, the external potential electrode 84 is connected to one terminal of a primary winding 120 of a transformer 122, the other terminal of the primary winding 120 being connected to the common point 62. A secondary winding 124 of the transformer 122 is connected between two terminals of a bridge rectifier 126, which preferably utilized silicon diodes. A filter 130 is connected between the other two terminals or output of the bridge rectifier 126, the output of the filter 130 being connected between the base and emitter electrodes of a transistor 128, for example, an NPN silicon transistor. A bias battery 132 is connected between one of the output terminals of the bridge rectifier 126 and the base of the transistor 128 to eliminate non-linearity at low input levels. The filter 130 is provided to smooth out the rectified voltage from the output of bridge rectifier 126 and comprises a first resistor 134 connected between the bias battery 132 and the base of the transistor 128, a first pair of parallel connected capacitors 136, 138 connected across the output of the bridge rectifier 126 and a second pair of parallel connected capacitors 140, 142 connected across the output of the bridge rectifier 126 through resistor 134. The first pair of capacitors 136 and 138 having an effective capacitance of 500 microfarads and the second pair of capacitors 140 and 142 having an effective capacitance of 1000 microfarads has proven to provide a smooth intelligible trace on the recording medium of recording device 31. The recording device 31, which may be of the D'Arsonval galvanometer or magnetic type, is connected between the emitter and collector electrodes of transistor 128 through a collector supply battery 144.

The current generator 60 and the signal receiving and recording device 27, the current electrode 68, the potential electrode 84 and the common electrode 62, as clearly shown in FIG. 2 of the drawing, through a slip ring connector 156 having a male element 154 mechanically connected to the frame 188 and a female element 160 mechanically connected to the lower end plate 54 of the inner case 48 and adapted and arranged to receive the male element 154 and a collector ring connector 67 having three collector rings 64, 70 and 88 and three corresponding brushes 66, 72 and 86. The collector rings 64, 70 and 88 are mounted on the inner case 48 and at one end thereof and the three corresponding brushes 66, 72 and 86 are supported within the capsule 20 but without the inner case 48 by the disk 46. A potential lead 89 from the signal receiving and recording device 27 is connected to the external potential electrode 84 through a first electrical conductor 152 in the male element 154 and a corresponding first electrical conductor 158 in the female element 160 of the slip ring connector 156, the collector ring 88 and brush 86 of the collector ring connector 67 and suitably insulated openings 168 and 170 in the capsule 20 and the housing 14 respectively. A ground potential lead 61 from the signal receiving and recording device 27 is connected to the common point or electrode 62 through a second electrical conductor 184 in the male element 154 and a corresponding second electrical conductor 186 in the female element 160 of the slip ring connector 156, the collector 64 and brush 66 of the collector ring connector 67. The common point or electrode 62 may be considered as a point on the disk 46 since the disk 46 is substantially at the same electrical potential as is the drill stem 10 due to the conductive metallic connectors therebetween. A current lead 63 from the generator 60 is connected to the external current electrode 68 through a third conductor 172 in the male element 154 and a corresponding third conductor 174 in the female element 160 of the slip ring connector 156, the collector ring 70 and brush 72 of the collector ring connector 67 and suitably insulating openings 180 and 182 in the capsule 20 and the housing 14 respectively. It should be understood that where there are high current requirements two or more conductors in the male and female elements of the slip ring connector 156 may be used in parallel connection. For lower brush contact resistance two brushes, in parallel, are used to make contact with each ring of ring connector 67. A ground current lead 59 from the generator 60 is connected to the common point or electrode 62 through a fourth electrical conductor 190 in the male element 154 and a corresponding fourth electrical conductor 191 in the female element 160 of the slip ring connector 156, the lower end plate 54 of the inner case 48 by electrical connection at point 62', the lower support shaft 58 and a ground contact means 194 mounted in the bottom cap 26 of the pressure tight capsule 20 so as to provide a highly conductive electrical connection between the lower shaft 58 and the bottom cap 26, as described hereinafter in more detail.

FIG. 2 shows somewhat in detail the arrangement between the upper and lower support shafts 56 and 58 of the inner case 48 and the upper and lower thrust bearings 42 and 44, respectively which are mounted in recesses in the top and bottom caps 24 and 26 of the capsule 20. The lower bearing 44 is essentially a ball bearing having an innerrace 162 upon which a shoulder 164 of the shaft is seated and an outerrace 166 which is seated upon a shoulder 176 of the bottom cap 26. The upper support shaft 56 of the inner case 48 is similarly inserted into the upper thrust bearing 42 in the top cap 24.

The lower support shaft 58 in addition to being seated in the lower bearing 44 also engages the ground contact means 194 which provides an electrically conductive path between the lower shaft 58 and the bottom cap 26. The contact means includes a supporting member 196 secured to the bottom cap 26, a brush holder 198 disposed in an opening in the support member 196 and firmly held therein by a press fit. Located within the brush holder 198 is a plunger of carbon or a hard copper brush 200 extending from one end of the holder 198 to engage the lower end of shaft 58, and preferably a coin silver insert 204, and a spring means 202 adapted to urge the plunger or brush 200 toward the shaft 58 so as to provide an electrical connection between the inner case 48 and the capsule 20 having substantially zero contact resistance.

The frame 188, which is adapted to slide into the inner case 48 and which supports the relatively sensitive logging equipment is provided with a shock absorbing material 179, for example, a rubber like material, preferably neoprene. This shock absorbing material 179 is applied to the outer surface or periphery of the frame 188 to be located between the frame 188 and the cylinder 50 of the inner case 48 when the frame is disposed within the inner case 48, whereby the frame 188 is protected from horizontal or transverse shock or vibration to which the drill stem 10 may be subjected during the course of drilling. In order to protect the frame 188 and the logging equipment from vertical shock and vibration shock absorbing material, such as a first rubber cushion 193, is disposed between the lower end of the frame 188 and the lower end plate 54 of the inner case 48 and a second rubber cushion 192 is disposed between the upper end 52 of the inner case 48 and the upper end of the frame 188.

When the drill string is completely assembled the drill stem 10 may be rotated in the usual manner by an appropriate prime mover, not shown, to operate the drill bit in the usual manner, since the housing 14 is designed to withstand forces which are equal to or greater than the rated strength of the elements of a conventional drill stem. Furthermore, mud circulation through the drill stem is not substantially retarded by the additional apparatus within the housing 14 since the cross sectional area of the mud duck provided between inner surface of the tubular housing 14 and the external surface of the capsule 20 is equal to or greater than the cross sectional area of the opening through the conventional collar or collars 16.

In order to make the resistivity log, the switch 114 is placed in its closed position to energize the motor 100 which drives the commutator 110 to produce an alternating current voltage of, preferably, about 26 cycles per second. This voltage is applied between the common point 62 and the current electrode 68 to pass an alternating current between the current electrode 68 and the drill stem 10 or common point 62 through the borehole in which it is assumed there is relatively conductive drilling mud and hence through the subsurface formations. With current flowing through the subsurface formation opposite the housing 14, the potential electrode 84 will detect the voltage differential between the potential electrode 84 and the common point 62, which voltage will vary as a function of the resisitivity of the earth's formations, thus to provide the necessary information for producing a resistivity log of a two electrode arrangement of an electrical logging system. The transformer 122 is used to increase the detected potential between the potential electrode 84 and the common point 62 before it is applied to the bridge rectifier 126 and to isolate unwanted direct current galvanic potentials from the measuring or recording circuit. The direct current voltage at the output of the bridge rectifier 126 is smoothed out by filter 130 before it is applied to the recording device 31 through the transistor amplifier 128.

Although an electrical logging system employing a two electrode arrangement has been described, it should be understood that the apparatus of this invention may be used with systems employing, for example, a three electrode arrangement, as illustrated in FIG. 3 of the drawing. This arrangement includes the current electrode 68, an additional second current electrode embedded in the layer of insulation 38, spaced a short distance from the first current electrode and connected to the generator 60 by lead 111 and the potential electrode 84 which supplies a voltage with respect to ground potential at the point 62 to the primary winding 120 of the transformer 122 of the signal receiving circuit 29 and which is spaced from point 62 and the two current electrodes 68 and 69 and embedded in the insulation layer outside the two current electrodes. Other well-known electrode arrangements may also be used in the practice of this invention.

When a resistivity log of a borehole is being produced simultaneously with the well drilling operation, that is at a time when the conductive metallic drill string 10 is in the borehole, careful consideration must be given to the insulation between the electrodes and the metallic drill string 10. The insulation must be capable of withstanding high temperatures and shock and it must be of high electrical resistance to avoid excessive leakage between the electrodes and the drill string. Furthermore, it must be highly abrasion resistant to avoid the necessity of frequently reapplying the insulation on the drill string. An insulation material which has been found suitable for electrical logging while drilling systems is described in the copending U.S. patent application of Clements and Stelzer having Serial No. 677,994, filed August 13, 1957, now Patent No. 3,072,843, granted January 8, 1963.

It should be noted that the recording medium of the recording device 31 may be driven at a constant speed from a noted or recorded starting time so that the amount of the recording medium payed out in the recording device 31 is at all times known. In order to determine the depth at which the apparatus is logging at a given time it is only necessary to correlate the location of the drill bit in the borehole with time. Consequently, with this information the deflections recorded on the recording medium can be plotted against depth. The time-depth recording device may be of any suitable type but it has been found that convenient devices for correlating the depth in the borehole of the drill bit with time are the well-known Geolograph and Rig-Runner which may be used to provide a record of the height of the kelly or traveling block in the derrick against time and which type is described more fully in U.S. Patents Nos. Re. 21,297 and 2,287,819. Knowing the amount of travel of the kelly or block with time, the depth of the bit can be determined accurately, thus providing sufficient information to readily produce a graph of a characteristic versus depth.

Accordingly it can be seen that the invention provides an improved rugged self-contained logging device which may be readily located in the drill string near the drill bit to log subsurface formations simultaneously with the drilling process. Although the apparatus of this invention operates under severe requirements of heat, mechanical vibration, and shock at the point of drilling, the logging device is so constructed that even a sensitive D'Arsonval-type galvanometer contained therein can be used to produce a clear and accurate log.

Obviously, many modifications and variations of the invention as hereinabove set forth may be made without departing from the spirit and scope thereof and therefore only such limitations should be employed as are indicated in the appended claims.

We claim:

1. Apparatus for producing an electrical log of subsurface formations traversed by a borehole comprising an electrically conductive housing adapted to be inserted in a drill string, a fluid-tight capsule containing an electrically conductive inner container, said capsule being supported by said housing, said container being supported in said capsule so as to be rotatable with respect thereto, an alternating current voltage generator including a commutator having a brush consisting essentially of an alloy having 85 to 95 percent silver and 5 to 15 percent copper, an electrode mounted on and insulated from said housing, means for applying the output voltage from said generator between said electrode and said housing, said applying means comprising ground contact means including a brush within said capsule for engaging a collector ring mounted on said container, said capsule being electrically conductive and coupled to said housing.

2. Apparatus as set forth in claim 1 wherein a portion of said container consists essentially of an alloy of 85 to 95 percent silver and 5 to 15 percent copper and wherein said ground contact means further includes a supporting member attached to said capsule, a second brush, a brush holder containing said second brush and secured to said supporting member by a press fit and spring means disposed in said brush holder to urge said second brush toward the alloy portion of said container.

3. Well logging apparatus comprising a housing adapted to be mounted in a conventional rotary drill string, means for mounting said housing in the drill string for rotation about the given rotational axis of the drill string when said drill string is rotated during drilling operations, a pressure tight capsule disposed within and fixedly mounted to the housing, means defining a passageway to permit fluid to pass through said housing past said capsule, a rotatable inner case having a shaft connected to each end thereof disposed within the capsule, means including said shaft for mounting said inner case for substantially free rotation about the given rotational axis of said housing, means including a brush electrically contacting one of said shafts for passing current between the capsule and inner case through the end of said one of said shafts, means mounted within the inner case for continuously receiving a signal which is a function of said current and means disposed within the capsule for continuously recording the received signal.

4. In well logging apparatus for conducting an electrical well log of earth formations traversed by a bore hole during the drilling of the bore hole comprising a fluid-tight capsule adapted to be mounted within a drill string in the vicinity of a drill bit, a freely rotatable inner instrument assembly within said sealed capsule and mounted for rotation about the principal axis of the drill string, means within said instrument assembly including a source of electric logging current, means for coupling said source of logging current to an electrode assembly external of said instrument assembly for application of said current to the earth formations adjacent the bore hole, means external of said instrument assembly for detecting an electric effect produced in said formations due to said applied logging current, said instrument assembly including a utilization device for indicating the effect detected by said detecting means, means for coupling an electric signal of the detected effect to said utilization device, the means for coupling the logging current from said source to said logging electrodes and the means for coupling said electric signal from said detecting means to said utilization device comprising a common brush assembly, said brush assembly including a brush consisting essentially of coin silver.

5. In well logging apparatus for conducting an electrical well log of earth formations traversed by a bore hole during the drilling of the bore hole comprising a fluid-tight capsule adapted to be mounted within a drill string in the vicinity of a drill bit, a freely rotatable inner instrument assembly within said sealed capsule and mounted on shaft means for rotation about the principal axis of the drill string, said instrument assembly including a source of electric logging current, means for coupling said source of logging current to an electrode assembly external of said instrument assembly for application of said current to the earth formations adjacent the bore hole, means external of said instrument assembly for detecting an electric effect produced in said formations due to said applied logging current, said instrument assembly including a utilization device for indicating the effect detected by said detecting means, means for coupling an electric signal of the detected effect to said utilization device, the means for coupling the logging current from said source to said logging electrodes including a brush mounted to said capsule and resiliently urged against one end of said shaft means of said instrument assembly.

6. Apparatus according to claim 5 wherein said brush and shaft means are also included in the means for coupling said electric signal of the detected effect to said utilization device.

7. Apparatus according to claim 5 wherein said brush is formed essentially of hard copper.

8. Apparatus according to claim 5 wherein at least the portion of said brush in electrical contact with said shaft means is formed essentially of coin silver.

9. In well logging apparatus comprising the combination of an alternating current generator including a commutator, a pair of electrodes, and means for coupling said electrodes to said generator, the improvement wherein at least one of said electrodes is coupled to said commutator by means of a commutator brush consisting essentially of 85–95 percent silver and 5–15 percent copper, and wherein one of said electrodes is a conductive housing and wherein said coupling means comprises ground contact means for coupling said generator to said conductive housing, said ground contact means including an additional brush mounted in fixed relation to said housing and electrically connected thereto.

10. The combination as set forth in claim 9 wherein said coupling means further includes a supporting member attached to said housing, a brush holder containing said additional brush and secured to said supporting member by a pressed fit and spring means disposed in said brush holder so as to urge said additional brush out of said holder.

11. The combination as set forth in claim 10 wherein said additional brush consists essentially of hardened copper.

References Cited in the file of this patent

UNITED STATES PATENTS

| | | |
|---|---|---|
| 1,605,432 | Fredriksen | Nov. 2, 1926 |
| 1,732,839 | Fredriksen | Oct. 22, 1928 |
| 1,999,215 | Smith | Apr. 30, 1935 |
| 2,116,120 | Malmgren | May 3, 1938 |
| 2,568,241 | Martin | Sept. 18, 1951 |
| 2,569,867 | Norelius | Oct. 2, 1951 |
| 2,596,024 | Goble et al. | May 6, 1952 |
| 2,681,567 | Widess | June 22, 1954 |
| 2,700,897 | Arps | Feb. 1, 1955 |
| 2,755,431 | Scherbatskoy | July 17, 1956 |
| 2,755,432 | Arps et al. | July 17, 1956 |
| 2,806,113 | Romer | Sept. 10, 1957 |
| 2,859,013 | Peterson | Nov. 4, 1958 |